Figure 6:
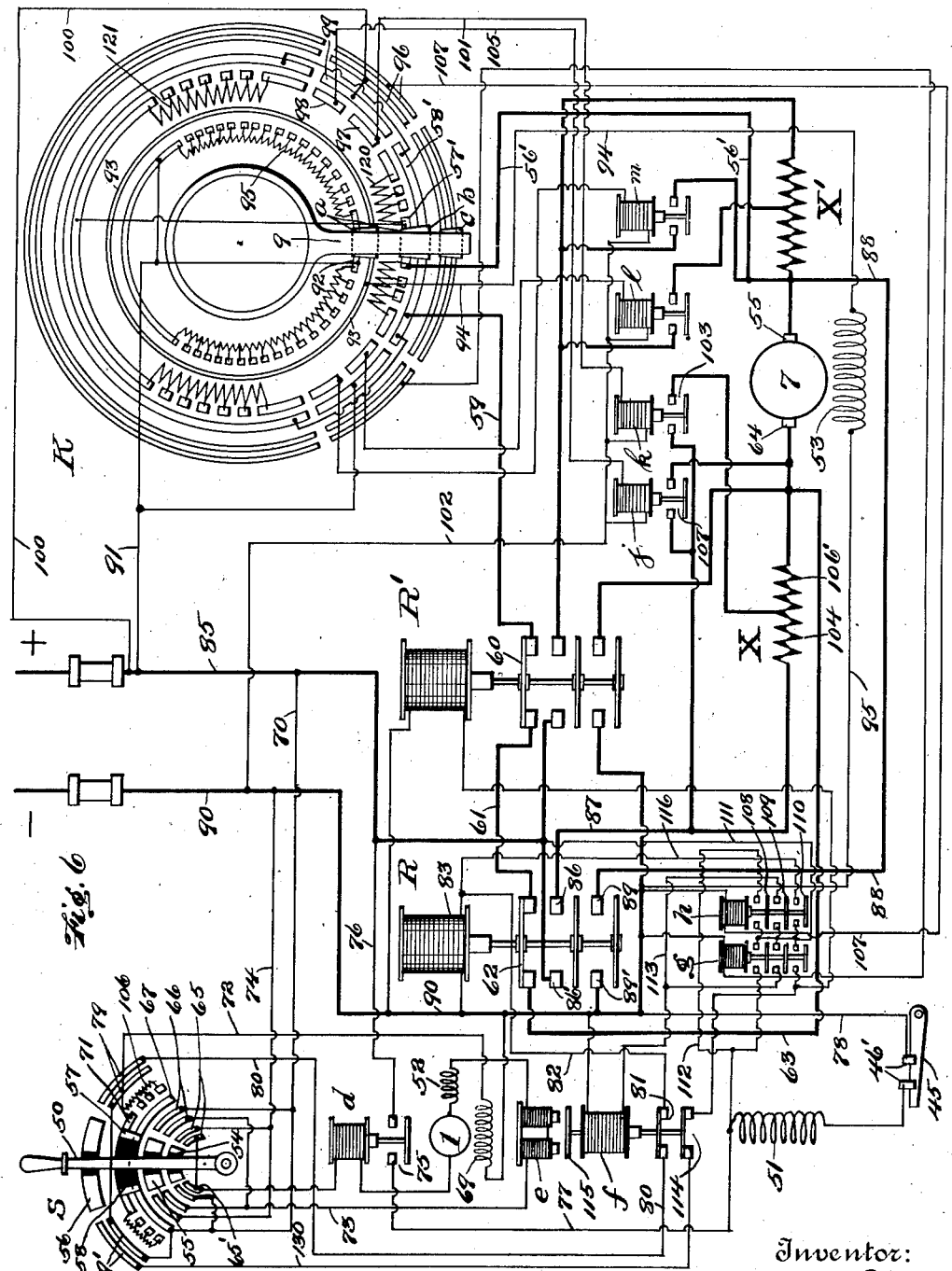

C. R. PRATT.
CONTROLLING MECHANISM FOR MOTORS.
APPLICATION FILED AUG. 7, 1908.
1,048,999.
Patented Dec. 31, 1912.
3 SHEETS—SHEET 1.
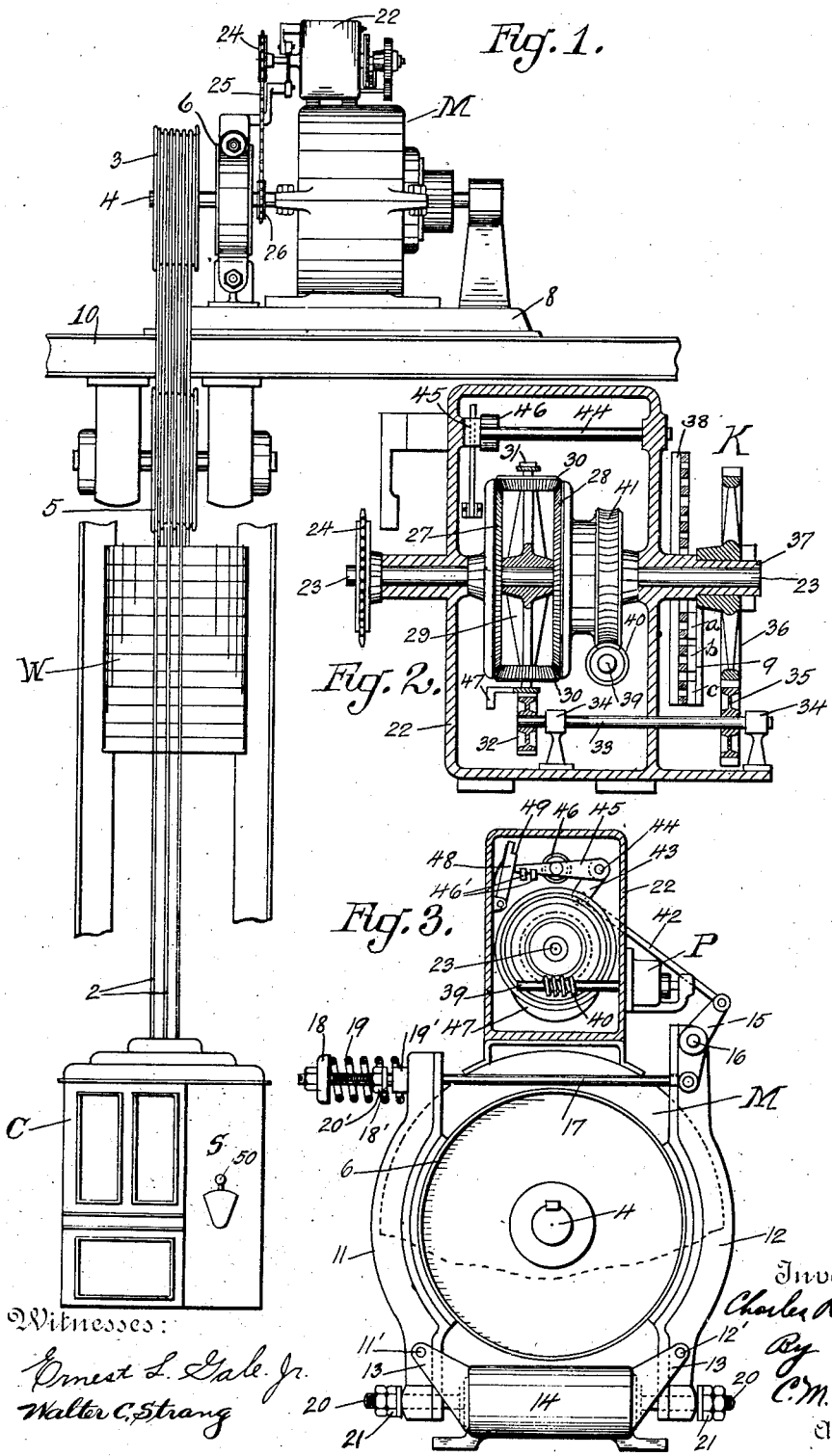

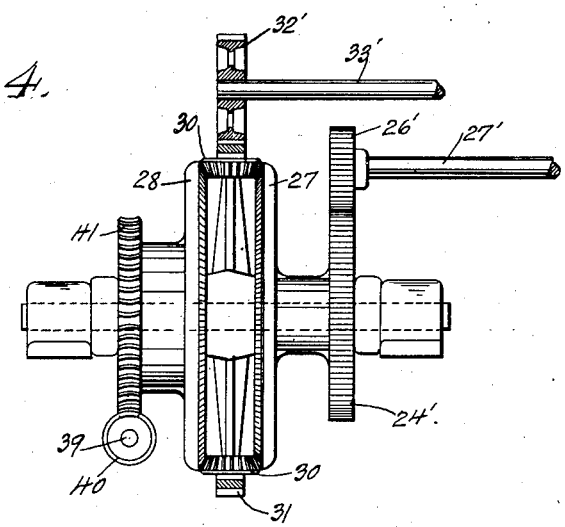
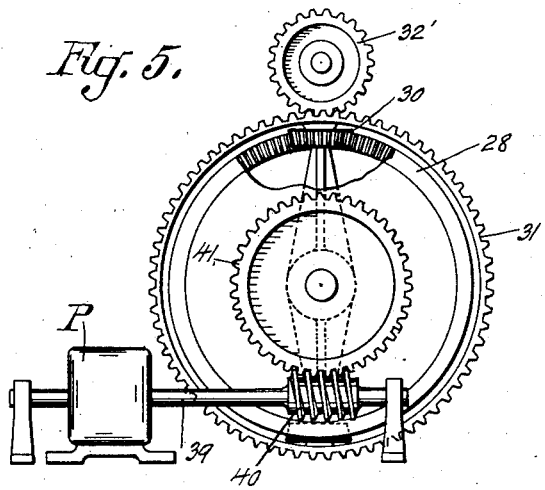

C. R. PRATT.
CONTROLLING MECHANISM FOR MOTORS.
APPLICATION FILED AUG. 7, 1908.

1,048,999.

Patented Dec. 31, 1912.

3 SHEETS—SHEET 3.

Witnesses:
Walter C. Strang
M. M. Rickard

Inventor:
Charles R. Pratt
By
C. M. Nissen
Attorney

UNITED STATES PATENT OFFICE.

CHARLES R. PRATT, OF MONTCLAIR, NEW JERSEY.

CONTROLLING MECHANISM FOR MOTORS.

1,048,999.  Specification of Letters Patent.  Patented Dec. 31, 1912.

Application filed August 7, 1908. Serial No. 447,359.

*To all whom it may concern:*

Be it known that I, CHARLES R. PRATT, a citizen of the United States, residing at Montclair, in the county of Essex and State of New Jersey, have invented a new and useful Improvement in Controlling Mechanism for Motors, of which the following is a specification.

My invention relates to mechanism for regulating and controlling the speed of prime movers, such as steam engines, steam turbines, electric motors, hydraulic motors, etc.

One of the objects of the invention is the provision of means for automatically regulating and maintaining a uniform speed of a motor, regardless of the load.

Another object of the invention is to provide, in combination with a motor and regulating mechanism therefor, automatic means for positively operating said mechanism when the motor varies from a predetermined or normal speed to effect a return of the motor to normal speed.

A further object of the invention is the provision, in combination with a main or power motor and a controlling pilot motor adapted to run in synchronism, of controlling mechanism for the main motor, and means for effecting a positive operation of said mechanism when the relative speed of the motors is varied to effect a return to synchronism.

A still further object of the invention is to provide, in combination with a motor, improved controlling means for securing any desired speed of the motor within wide limits.

Other objects of the invention will appear hereinafter, the novel combinations of elements being set forth in the appended claims.

Referring to the accompanying drawings, Figure 1 is an elevation view, partly diagrammatic, showing an elevator system to which my invention is applied; Fig. 2 is a sectional elevation on a larger scale of the planetary gearing located between the main and pilot motors, and the main motor controller adapted to be operated by said gearing; Fig. 3 is a view showing the main motor brake and brake-operating mechanism; Figs. 4 and 5 are respectively a front and a side elevation showing certain modifications of the mechanism shown in Fig. 2; and Fig. 6 is a diagrammatic view of electrical circuits and controlling mechanism which may be used in connection with the elevator system shown in Figs. 1 to 3.

The invention is adapted to have a wide application in the regulation and control of motors of various kinds. In general, it comprises a main motor or prime mover, such as a steam engine, gas engine or electric motor, and an auxiliary or pilot motor, with planetary or other differential gearing between the motors, and an automatic controller or speed regulator for the main motor. The automatic speed regulator or controller is connected for operation to the differential gearing, and is adapted to be operated when the motors are out of synchronism to effect an increase or decrease in the speed of the main motor to bring it into synchronism with the pilot motor.

In order to show a practical application of the invention and to clearly set forth its principles and methods of operation, I have illustrated in Figs. 1 to 3 an elevator system embodying one form of the invention. As here shown, an electric motor M is mounted on a bed-plate 8 secured to the I-beams 10 at the top of the elevator shaft. The elevator car C is suspended by cables 2 connected at one end to the car and extending upwardly over the drive sheave 3 on the motor shaft 4, down and around the idler sheave 5, up over the drive sheave 3 again, and down to the counterweight W to which the opposite ends are secured.

A brake pulley 6 keyed to the shaft 4 is conveniently located between the motor and the drive sheave. The brake levers 11 and 12 are pivoted at 11' and 12' to brackets 13 secured to or formed on the body of the brake magnet 14. A lever 15 is pivoted at 16 to the upper end of the brake lever 12. The lower end of the lever 15 is pivotally connected to a rod 17 extending through the brake levers and provided at its free end with an adjustable stop or head 18. A brake-applying spring 19 surrounds the rod 17 and bears at its opposite ends against the head 18 and the brake lever 11. The brake levers are adapted to be operated to lift the brake shoes by the rods 20 connected at their inner ends to the cores of the brake magnet. These rods extend through openings in the lower ends of the brake levers, and are provided with nuts 21 for adjusting the positions of the magnet cores. When the brake magnet is energized, its cores are drawn inward and lift the brake shoes from the brake pulley against the tension of the spring 19. A buffer 19' of soft rubber or other elastic material may be mounted on the rod 17 between the brake lever 11 and a washer 18' adjustably held in position by a nut 20'. The washer 18' is preferably spaced a short distance from the elastic buffer, so that the latter will only be compressed during the final portion of the movement of the brake lever. If the spring 19 should break or become inoperative, the nut 20' can be set up toward the brake shoe 11 so that the rod 17 can operate through the elastic buffer to apply the brake, the elastic buffer providing for a yielding pressure of the brake shoes.

Mounted on the frame of the motor M is a casing 22 containing planetary gearing forming a connection between the main or power motor M and a small auxiliary or pilot motor P. Journaled in bearings in the frame 22 is a shaft 23, to one end of which is secured a sprocket wheel 24 connected by a sprocket chain 25 to a sprocket wheel 26 secured to the motor shaft 4. Keyed to the shaft 23 is a bevel gear wheel 27 opposite a similar gear wheel 28 loosely mounted on the shaft 23. Between the opposing faces of the gears 27 and 28 is a wheel or spider 29 loose on the shaft 23 and carrying bevel pinions 30 journaled on the radial arms of the spider and each meshing with the gears 27 and 28. The spider 29 also carries an annular spur gear wheel or ring 31 located outside of the pinions 30 and meshing with a gear wheel 32 secured to a shaft 33 journaled in bearings 34. A pinion 35, fixed to the shaft 33, meshes with a gear wheel 36 journaled on a sleeve 37 which also forms a bearing for the shaft 23. The gear wheel 36 carries a switch arm 9 provided with electrical contacts $a$, $b$, $c$, each in sliding engagement with and bridging two arc-shaped contacts on the stationary disk 38 of the automatic controller K. The shaft 39 of the pilot motor P is provided with a worm 40 which meshes with a worm wheel 41 secured to or formed integral with the gear wheel 28.

The lever 15 on the upper end of the brake lever 12 is connected by a link 42 to a crank arm 43 on a rock-shaft 44 journaled in the upper part of the casing 22. A switch arm 45 secured to the shaft 44 carries a roller 46 located in the path of movement of a cam 47 secured to or formed integral with the gear ring 31. The switch arm normally engages switch contacts 46'. A spring-pressed catch 48 bears against the end of the switch arm, and is formed with a shoulder 49 adapted to engage beneath the switch arm and prevent its return after said arm has been lifted by the cam 47.

The operation of the mechanism above described will be understood from the following explanation. Assuming the parts to be at rest and it is desired to start the car, the switch lever 50 of the car switch S is moved either to the right or to the left, depending on the direction in which it is desired to move the car. This effects a supply of current to the pilot motor P through circuits presently to be described, so that said motor is started and runs at a speed depending on the extent of movement of the switch lever 50. Current is also supplied to the brake magnet 14 to lift the brakes, and to the main motor M to start it and run it at slow speed. The pilot motor operates through the worm and worm wheel to rotate the gear wheel 28 in one direction, and the main motor M operates through the sprocket chain and gears to rotate the gear wheel 27 in the opposite direction. The rotation of the gear wheels 27 and 28 rotates the pinions 30 about their axes, and as the gear wheel 28 operated by the pilot motor rotates faster than the gear wheel 27, the spider 29 is rotated on the shaft 23. This operates through the gears 31, 32, 35 and 36 to rotate the switch arm 9 and move the contacts $a$, $b$, $c$ over the stationary contacts of the controller K. The movement of the arm 9 causes an increase in the speed of the motor M by effecting a weakening of the motor field and a decrease in the resistance in the armature circuit. This increase in speed is in proportion to or varies with the extent of movement of the arm 9, and the motor continues to accelerate until the gear 27 is running at the same speed as the gear 28, when the arm 9 is brought to rest in position to maintain the motor at said speed. Any variation in the speed of the main motor, due to an increase or decrease in the load, or other causes, will cause the arm 9 to move in a direction to bring the motor back to normal speed. If the car switch is moved so as to impart a different speed to the pilot motor, the speed of the main motor will be correspondingly changed, the differential gearing always moving the controller arm 9 into position to bring the motors into synchronism.

The arm 9 is driven by two separate and independent forces, $i.$ $e.$, by the controlling motor P always tending to drive it away from the stop position at a speed proportional to the speed of the motor P, and by the hoisting motor M normally driving it toward the stop position at a speed proportional to the speed of the motor M. Whenever the two motors revolve in opposite directions at the fixed relative speed at which they are in synchronism, the arm 9 remains stationary. When the motor M exceeds said fixed speed relative to the pilot motor, it moves the arm 9 to close circuits which retard its speed, and when the motor falls below said speed it moves the arm 9 to close circuits which accelerate its speed. If, therefore, the limits of speed of the pilot motor are within the range of speeds of the main motor, then the main motor must always run at the same speed relative to the pilot motor. Therefore the position of the switch in the car indicating the exact speeds of the pilot motor, which may be regulated by the amount of resistance in the field circuit, also indicates the exact speeds of the main motor, irrespective of the load.

Figs. 4 and 5 show a somewhat different arrangement of the gearing between the main and pilot motors. As here shown, a spur gear wheel 24' is formed integral with the bevel gear 27 and meshes with a spur pinion 26' on a shaft 27', which may be connected directly or through any suitable train of gearing to the main motor. The annular gear 31 meshes with the gear pinion 32' on the shaft 33', which latter may be connected to operate a controller for the main motor. The form of controller will of course depend to a large extent on the kind of motor to be controlled. If the main motor is a direct current electric motor, the controller may be the same as that shown in Fig. 6, or any other desired form of controller adapted to control a direct current motor. If the main motor is a steam engine, the shaft 33' may be connected to a slide valve or any other form of mechanism usually operated by a centrifugal speed governor to control the speed of the engine. Various other types of prime movers or power motors and controlling mechanism therefor may be used in connection with my invention. The type of pilot motor used may also be widely varied to suit varying conditions found in practice.

In Fig. 6 are shown the electrical circuits and controlling mechanism forming a part of my invention as applied to an elevator system. This mechanism comprises a manual switch or controller S which may be located in the elevator car, an automatic controller K, reversing switches R, R' for the armature circuits of the main motor, starting resistance X, X' for the main motor, relay magnets $j$, $k$, $l$, $m$ controlling the resistance X, X', shunt field winding 53 and brake magnet coil 51 for the main motor, brake magnet coil 52 for the pilot motor, magnet $d$ controlling a circuit for the main brake magnet, magnets $e$ and $f$ controlling the circuits of the reversing switches, and relay magnets $g$ and $h$. The manual controller S comprises the lever 50 carrying contacts 54, 55, 56, 57 and 58, each adapted to bridge a pair of stationary arc-shaped contacts when the lever 50 is moved to the right or left from the central position. The arm 9 of the controller K carries three insulated contacts $a$, $b$ and $c$, each adapted to bridge various sets of contacts as the arm 9 is rotated.

With the parts in the position shown, a local or dynamic brake circuit through the main motor armature 7 may be traced from the brush 55 through the conductor 56', stationary contact 57', sliding contact $b$, stationary contact 58', conductor 59, contact 60 of the reversing switch R', conductor 61, contact 62, and conductor 63, to the opposite brush 64 of the armature. Current is supplied from the positive and negative mains, designated by + and —. The field coil 69 of the pilot motor receives current at all times through a circuit which may be traced from the positive main through conductor 70, contacts 67, 57, 71, conductor 72, field coil 69, and to the negative main. When the switch lever 50 is moved, for example to the right, a circuit is established through the pilot motor armature, which may be traced through the conductor 70, contacts 66, conductor 73, coils of the magnet $e$, brake magnet coil 52 for the pilot motor, pilot motor armature 1, magnet $d$, contacts 65, and conductor 74 to the negative main. The magnet $d$ operates to lift its core and close the switch 75, establishing a circuit through the conductor 76, switch 75, conductor 77, main brake magnet coil 51, switch lever 45, and conductor 78 to the negative main. A circuit is also established through the magnet coil of the reversing switch R by way of conductor 70, contact 79', contacts 79, conductor 80, switch 81, conductor 82, and magnet coil 83 of the reversing switch R. The reversing switch R operates to open the dynamic circuit through the main motor armature and establish a line circuit through said armature as follows,—from the positive main through conductor 85, contacts 86', 86, conductor 87, starting resistance X, brush 64, armature 7, brush 55, conductor 88, contacts 89, 89', and conductor 90 to the negative main. A circuit is also closed through the field coil 53 of the main motor, which may be traced from the positive main through the conductor 91, contacts 92, $a$ and 93, conductor 94, field coil 53, conductors 95 and 90 to the negative main. As a result of these circuits, the brake magnets are energized and both the motors receive current through their armatures and field windings; the pilot motor P is operated at a speed depending upon the distance the lever 50 has been moved; and the main motor will run at slow speed in a direction to lift the car, with the resistance X in the armature circuit and a strong magnetic field. The arm 9 will be rotated in a counter-clockwise direction by means of the differential gearing shown in Fig. 2. As the arm moves from its central position, the sectional resistance 95 will be gradually introduced into the circuit of the field winding 53, thereby weakening the field and permitting the main motor to accelerate. If the arm 9 continues its movement far enough, the contact $b$ will bridge the contacts 97 and 99 and thereby establish a circuit through the magnet of relay $k$. This circuit is from the positive main, through the conductor 100, contacts 99, $b$, 97, conductor 101, magnet $k$, conductor 102 to the negative main. The magnet $k$ lifts its core and closes the switch 103, thereby short-circuiting the section 104 of the resistance X and permitting a further increase in the speed of the main motor. When the contact $b$ reaches the contact 98, a circuit is closed through the conductor 100, contacts 99, $b$, 98, conductor 105, relay magnet $j$, and conductor 102 to the negative main. The magnet $j$ operates to close the switch 107, and thereby short-circuit the remaining section 106' of the resistance X and permit the main motor to approach its normal full speed. When the speed of the main motor has been brought into synchronism with the pilot motor, the arm 9 will come to rest. This position will depend largely upon the load on the main motor. It will also depend upon the position of the lever 50. As the latter is moved to the right the resistance 106 will gradually be introduced into the circuit of the field coil 69, thereby weakening the field of the pilot motor and permitting its speed to increase. This will result in a further movement of the arm 9 to the right, so that the main motor may accelerate to correspond with the increased speed of the pilot motor.

When the contact $c$ engages the contacts 96, a circuit is established through the relay magnet $h$. This circuit may be traced from the positive main through the conductor 100, contacts 96 and $c$, conductor 107, winding of the magnet $h$, and conductor 90 to the negative main. The core of the magnet $h$ carries three contact strips 108, 109 and 110, adapted to bridge three sets of stationary contacts, the inner one of each of which is connected to the conductor 111 extending to the positive main. Then the magnet $h$ operates, the upper contact 108 establishes a circuit by way of conductor 111, contact 108, and conductor 112 to the main brake coil 51, and from the brake coil to switch 45, and conductor 78 to the negative main. The second contact strip 109 establishes a circuit from the positive main through said contact strip and conductor 113 to the magnet $f$, and from thence to the negative main. The magnet $f$ is therefore excited to lift its core and open the switches 81 and 114, bringing the armature 115 within the magnetic field of its magnet $e$. This latter magnet is not strong enough to lift its armature 115, but after the magnet $f$ has operated it acts as a holding magnet to retain the switches 81 and 114 open as long as the pilot motor is receiving current. The lower contact strip 110 of the relay magnet $h$ closes a circuit by way of the conductor 116 to the magnet coil 83 of the reversing switch R.

The result, therefore, of the operation of the relay magnet $h$ is to maintain a circuit through the main brake coil and through the reversing switch independently of the magnets $d$, $e$ and $f$ and the manual switch as long as the contact $c$ of the automatic controller remains on the contacts 96, and also to effect the operation of the magnets $e$ and $f$. The purpose of the magnets $e$ and $f$, and the switch 81 controlled thereby, is to insure the opening of the line circuit to the armature 7 and the closing of the dynamic brake circuit as soon as the contact $c$ has moved off the contacts 96, and to maintain the dynamic brake circuit as long as the pilot motor receives current.

To make clear the operation in stopping the main motor, we will assume that while it is running at normal speed the switch lever 50 is thrown quickly back to central position. This will cut off the supply of current to the pilot motor and its brake coil, so that said motor will be brought quickly to rest. This does not directly affect the reversing switch magnet or the main brake coil which still receive current by way of the circuits controlled by the relay magnet $h$. As soon as the speed of the pilot motor is reduced, the arm 9 begins to move back toward central position, gradually introducing the resistance X into the armature circuit, and also strengthening the shunt field to gradually reduce the speed of the motor until the contact $c$ runs off the contacts 96 and deënergizes the relay magnet $h$. By this time the main motor is running at slow speed. The operation of the magnet $h$ cuts off the supply of current from the main brake coil and the reversing switch magnet so that the magnetic brake is applied, the line circuit to the armature 7 opened, and the dynamic circuit closed, bringing the motor quickly to rest. If the switch lever 50 is moved part way back, only not far enough to open the circuit to the pilot motor, the circuit for the magnet $h$ will be opened and the reversing switch will be operated the same as when the lever 50 was thrown to central position as above explained, but the main brake coil will still receive current by way of the switch 75 and the reduction in speed will be more gradual. When the dynamic circuit through the armature 7 is first closed in slowing down the motor, it includes the resistance 120, which latter is gradually cut out as the contact $b$ approaches its central position. Instead of having the sections of the resistance 120 connected directly to the contacts on the controller, relay magnets similar to the magnets $j$ and $k$ may be used to control such resistance.

In slowing down the main motor when the load is sufficient to run it as a dynamo, the dynamic circuit with the variable resistance 120 and the field resistance 95 enable the operator to maintain full control, even when the speed is quite slow. In other words, by varying the position of the manual switch lever, the arm 9 may be moved to introduce more or less of the resistance 120 and 95, and thereby secure any desired degree of dynamic braking action, so that a very slow speed may be maintained.

During the normal operation, the arm 9 is never carried beyond the contacts 98, 99 and 96, as the main motor will synchronize with the highest normal speed of the pilot motor before the arm 9 has been carried beyond such contacts. If, however, while the motor is loaded, the current supply should suddenly be cut off, as, for example, by the blowing of a fuse, the load would cause the main motor to reverse, and thus drive the arm 9 rapidly upward beyond said contacts. This would have substantially the same effect as moving said arm toward central position; that is, the contact $c$ would be moved off the contacts 96, thereby opening the circuit through the relay magnet $h$ which would in turn drop its contacts 108, 109 and 110, thereby effecting the opening of the line circuit to the armature 7 and the closing of the dynamic brake circuit. This latter circuit would at first include the resistance 121 which would gradually be cut out as the contact $a$ moved upward until the armature 7 was practically short-circuited, thereby effecting a powerful dynamic braking action to bring the motor equipment to rest. If, however, the trouble was in some portion of the dynamic circuit, so that said circuit remained open, the arm 9 might be carried around until the cam 47 (Figs. 2 and 3) engaged the roller 46 on the switch arm 45 and lifted the latter. The arm 45 operates through the arm 43, link 42 and lever 15 to positively apply the brake. The operation of the arm 45 also opens the circuit of the brake magnet at the contacts 46'. The combined operation of the two brake-applying devices is therefore obtained, which effects a powerful action of the main brake.

To move the car downward, the switch lever 50 is moved to the left to supply current to the pilot motor armature in the reverse direction. Current is also supplied to the reversing switch R' by way of conductors 70, 130, and switch 114. The reversing switch R' operates to close a circuit through the armature 7 in the opposite direction, and including the resistance X'. Both the motors and the controller arm 9 will therefore be operated in the opposite direction. The controller K is substantially symmetrical with respect to a vertical axis, and the circuit connections from the left-hand side are similar to those already described, so that the operation of the controller during the downward travel of the car will be readily understood without further description.

It should be particularly noted that the worm gearing may be of such a low pitch that only the auxiliary motor can drive it. If there is any tendency at any time for the main motor to drive the worm wheel 41, the latter will be locked stationary; or the arrangement may be such that although the main motor could drive the worm 40, there would be considerable friction to overcome between the worm wheel and the worm. This is of advantage, for instance, where an emergency brake is to be operated with considerable power. In such event the main motor exerts considerable power to apply the brake through the cam 47, and if the worm and worm wheel are low pitch they cannot be driven, and therefore act as a fulcrum for the main motor to act against in applying the brake. This action may even take place during the normal operation of the speed control. The pilot motor is intended to operate only the speed control, and when the main motor tends to exceed its synchronous speed, the worm gear acts as a fulcrum for the power of the main motor to react on when it drives the differential gearing to operate the control.

By arranging the worm gearing in this manner, a comparatively small motor can be used as the pilot or auxiliary motor. For example, in some elevator installations a $\frac{1}{10}$ H. P. auxiliary motor may be used in connection with a 100 H. P. main motor, or $\frac{1}{4}$ H. P. auxiliary motor for the largest power units.

I wish not to be limited to the precise constructions herein shown, as various changes in the details of construction and arrangement of parts might be made by those skilled in the art without departing from the spirit and scope of the invention.

What I claim is:—

1. The combination with a plurality of motors, of differential gearing therebetween, a brake, and means operated by said gearing to apply the brake.

2. The combination with a plurality of motors, of planetary gearing therebetween, a brake, and mechanical means associated with said gearing for operating the brake.

3. The combination with a plurality of motors, of means for maintaining a predetermined relative speed of the motors, a brake, and mechanism dependent on a variation in the relative speed of the motors for operating the brake.

4. The combination with a plurality of motors, of a controlling device for one of the motors, mechanism for operating the controlling device when the relative speed of the motors varies from a predetermined ratio, a brake, and mechanism for automatically operating the brake when the controller has been operated beyond a predetermined point.

5. The combination with a main motor and a pilot motor, of differential gearing between the motors, a speed controller, a brake, and mechanical connections between the differential gearing and the brake and speed controller.

6. The combination with a main motor and a pilot motor adapted to run at a predetermined relative speed, a controller for one of said motors, means for operating the controller when the relative speed of the motor varies to bring them back to said relative speed, a brake, and means to operate the brake when the operation of the controller fails to restore the motors to said predetermined speed.

7. The combination with an electric motor, of an electro-magnetic reversing switch therefor, a pilot motor, a manual controlling device operable to establish circuits for the pilot motor and the magnet coil of the reversing switch and thereby effect the operation of the motors, an automatic controlling device for said electric motor, and means for operating said device and thereby accelerating said electric motor to a predetermined speed.

8. The combination with an electric power motor, of a pilot motor, an electro-magnetic reversing switch for the circuits of the power motor, a manual controller operable to supply current to the pilot motor and close a circuit for the magnet winding of the reversing switch, means operable when the power motor reaches a predetermined speed to establish a second circuit to said magnet winding and also effect an opening of the first-named circuit, and means for holding said first-named circuit open while the pilot motor is running.

9. The combination with a power motor, of an electro-magnetic brake therefor, a pilot motor, a manual device operable to effect the establishing of circuits for the pilot motor, the main motor, and the magnet coil of said brake, and means for automatically establishing a by-pass circuit to said brake magnet when the power motor attains a certain speed.

10. The combination with a main electric motor, of an auxiliary electric motor, worm gearing of comparatively low pitch connected to said auxiliary motor, differential gearing interposed between said worm gearing and the main motor, brake apparatus for the main motor, and means operated by the differential gearing for powerfully applying the brake against the worm gearing as a fulcrum.

In testimony whereof, I have signed my name to this specification in the presence of two subscribing witnesses.

CHAS. R. PRATT.

Witnesses:
  CHAS. M. NISSEN,
  WALTER C. STRANG.